No. 820,104. PATENTED MAY 8, 1906.
P. W. FAWCETT & E. L. W. BELLHOUSE.
PNEUMATIC TIRE.
APPLICATION FILED OCT. 25, 1904.
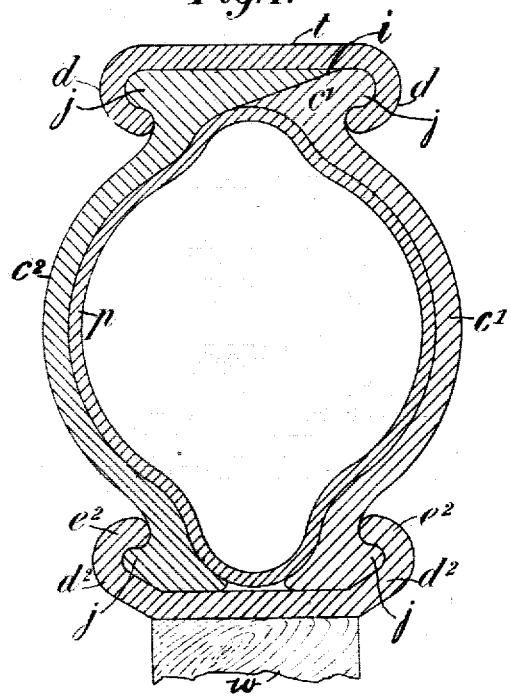
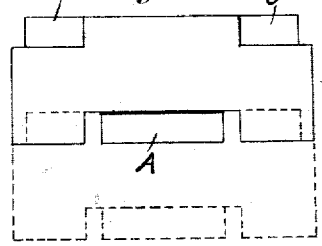
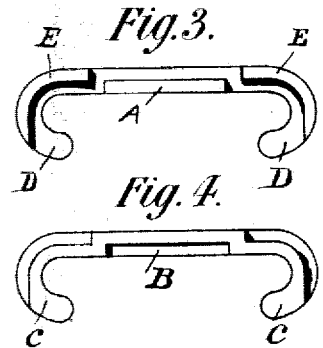
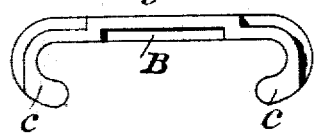
Witnesses
Inventors
Percy William Fawcett
Edward Lloyd Wynyard Bellhouse

UNITED STATES PATENT OFFICE.

PERCY WILLIAM FAWCETT AND EDWARD LLOYD WYNYARD BELLHOUSE, OF SHEFFIELD, ENGLAND.

PNEUMATIC TIRE.

No. 820,104.          Specification of Letters Patent.          Patented May 8, 1906.

Application filed October 25, 1904. Serial No. 229,950.

*To all whom it may concern:*

Be it known that we, PERCY WILLIAM FAWCETT, residing at Middlewood Hall, Sheffield, and EDWARD LLOYD WYNYARD BELLHOUSE, residing at Greno House, Sheffield, England, subjects of the King of Great Britain and Ireland, have invented a certain new and useful Improvement in Pneumatic Tires for Vehicles, (for which we have applied for Letters Patent in Great Britain, No. 23,994, November 5, 1903; in Germany, September 12, 1904; in France, No. 12,313, September 15, 1904, and in Belgium, September 13, 1904,) of which the following is a specification.

This invention relates to the construction of a removable tread of metal or other material and to the construction of a cover for the air-tube of pneumatic tires, and the drawings which form part of this specification illustrate the invention.

Figure 1 is a section of a complete tire fixed to the rim of a wheel; Fig. 2, a plan of a section of a flexible tread; Fig. 3, an end view of same at the narrow end; Fig. 4, a similar view at the broad end.

In carrying out the invention as shown in the sectional view, Fig. 1, for example, the tread $t$ is a ring of metal of the desired diameter and is made with turned-over edges $d$. The rim $d^2$ of the wheel $w$ is also made with similar turned-over edges $e^2$.

The cover for the air-tube $p$ is made in two half parts $C'$ and $C^2$, the division being circumferential through the outer and inner peripheries. Thus each part forms a complete annular side piece, and when put together they form a tubular cover for the air-tube. The top junction is preferably made diagonal, as shown at $i$, so that the edge of $C^2$ overlaps the edge of $C'$; but this is not essential.

Each part of the cover is made with two continuous ribs $j$, which fit underneath the turned-over edges of the tread $t$ and of the rim $d^2$, and when the air-tube $p$ is expanded, the parts being all in position, the ribs $j$ are forced into the spaces under the turned-over edges of the tread and rim and the several parts are securely held together. As a modification the said cover may be made without an upper division. Thus it would be in one piece; but it would have the continuous ribs, as before described, by which the tread is secured. Instead of making the tread as a solid ring it may be made in sections to render it flexible. Such a section is shown in Figs. 2, 3, and 4. They are made to engage with each in such a manner that lateral displacement is prevented; but adjustment circumferentially to the variations in diameter, due to expansion of the air-tube, is automatic and easy. These tread-sections are made to clip upon the tire. The lip A fits loosely into the recess B in the next section and the parts C slide underneath the overhanging parts E and abut against D. Thus the sections can be drawn apart longitudinally as they would be on the expansion of the tire or slightly when the under side of tire was flattened by the weight of the car, but cannot disengage sidewise.

The chief features of the invention are the construction of the air-tube cover and a removable tread with turned-over edges for the purpose of attachment.

Having now described our invention, what we claim as new, and desire to secure by Letters Patent, is—

A flexible metallic tread for pneumatic tires of wheels consisting of a plurality of sections, each section having a central tongue at one end and a corresponding recess at its other end and recesses on each side of the central recess on the upper side of the section and overhanging portions at its other end on each side of the tongue, the tongues and overhanging portions engaging the corresponding recesses in the adjacent sections.

In witness whereof we have hereunto set our hands in presence of two witnesses.

PERCY WILLIAM FAWCETT.
    EDWARD LLOYD WYNYARD BELLHOUSE.

Witnesses:
    ROBT. F. DRURY,
    LUTHER J. PARK.